United States Patent
Gegner

(10) Patent No.: US 7,037,383 B2
(45) Date of Patent: May 2, 2006

(54) PROCESS FOR PRODUCING A COMPONENT FROM METAL

(75) Inventor: Jürgen Gegner, Fürth (DE)

(73) Assignee: AB SKF, Gothenburg (SE)

( * ) Notice: Subject to any disclaimer, the term of this patent is extended or adjusted under 35 U.S.C. 154(b) by 192 days.

(21) Appl. No.: 10/372,110

(22) Filed: Feb. 25, 2003

(65) Prior Publication Data

US 2003/0193120 A1 Oct. 16, 2003

(30) Foreign Application Priority Data

Mar. 1, 2002 (DE) .......................... 102 09 264

(51) Int. Cl.
*C21D 9/36* (2006.01)
*C21D 9/00* (2006.01)

(52) U.S. Cl. .................. 148/226; 148/664; 148/607; 148/622; 148/660; 148/663; 148/906; 148/567; 559/662

(58) Field of Classification Search ............. 148/664, 148/607, 622, 662, 226, 906, 567, 663, 660, 148/559

See application file for complete search history.

(56) References Cited

U.S. PATENT DOCUMENTS

| | | | | |
|---|---|---|---|---|
| 4,204,437 A | * | 5/1980 | Espana | ...................... 76/108.2 |
| 5,112,411 A | * | 5/1992 | Greenfield | ................... 148/528 |
| 6,176,948 B1 | * | 1/2001 | Lund et al. | .................. 148/654 |
| 6,478,893 B1 | * | 11/2002 | Takemura | .................... 148/320 |

FOREIGN PATENT DOCUMENTS

| | | |
|---|---|---|
| DE | 39 10 959 C2 | 11/1990 |
| DE | 100 03 720 A1 | 8/2001 |
| EP | 0 718 410 A1 | 6/1996 |
| EP | 0 943 694 A1 | 9/1999 |
| GB | 852359 | 10/1960 |

* cited by examiner

*Primary Examiner*—Deborah Yee
(74) *Attorney, Agent, or Firm*—Buchanan Ingersoll PC

(57) ABSTRACT

A process for producing a component of metal includes a) carrying out a heat treatment to harden the component, which ends with a heating process, especially with a tempering or microstructural transformation process, at a given temperature ($T_E$); b) carrying out at least machining of the component at room temperature ($T_U$) in order to provide its desired geometrical shape; and c) subsequent heating of the component to a temperature (T) which is greater than room temperature ($T_U$).

11 Claims, 1 Drawing Sheet

PROCESS FOR PRODUCING A COMPONENT FROM METAL

This application is based on and claims priority under 35 U.S.C. § 119 to German Application No. 102 09 264.8 filed on Mar. 1, 2002, the entire content of which is incorporated herein by reference.

FIELD OF THE INVENTION

The invention relates to a process for producing a component from metal.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

One such process is described in DE 39 10 959 C2. It is provided there that the metallic component is first subjected to heat treatment to harden the part. Heat treatment ends with an tempering process in which the component is kept at the tempering temperature for a given time. The heat treatment is followed by finishing (grinding and honing). Tempering takes place for up to 1 to 2 hours, this results in the entire component being heated.

A similar process is known from DE 100 03 720 A1. A heat treatment process which conventionally ends with a tempering process is also disclosed here. Then machining takes place.

The dislocation mobility within a material which begins under cyclic stress (for example by rolling elements rolling over the material), will in operation act as a material fatigue mechanism and greatly contribute to material softening and thus to failure of components made from the material. This can be observed especially in rolling bearing applications. Stabilization of the existing dislocation structure within a material does not occur by known production processes. Thus, stabilization of the residual compressive stress state which is introduced with suitably completed surface treatments is not achieved either.

SUMMARY OF THE INVENTION

Therefore, one object of the invention is to increase the service life of the component by stabilizing the dislocation state. Another object is to provide a method that represents an advance in the art.

Achieving these objects by the invention may include sequentially performing the following steps.

a) Carrying out heat treatment to harden the component, which ends with a heating process, especially with a tempering or microstructural transformation process, at a given temperature;
  b) Carrying out at least machining of the component at room temperature in order to bring it to its desired geometrical shape;
  c) subsequent heating of the component to a temperature which is greater than room temperature.

Step c) here preferably terminates the production of the component.

According to a first additional aspect, when carrying out the aforementioned step c) the component is heated in a furnace or by means of infrared radiation, in each case in an air or protective gas atmosphere, or is kept in a salt bath. The component can also be inductively heated in air or in a protective gas atmosphere when step c) is carried out.

The temperature can optionally be between 50° C. and 400° C. when the aforementioned step c) is carried out.

Heat treatment according to the aforementioned step a) can be martensitic through hardening, case hardening or induction hardening of steel with a final short-term or conventional tempering process. Heat treatment according to the aforementioned step a) can also be bainitic hardening of a steel or hardening of steel into a bainitic-martensitic or martensitic-bainitic mixed structure. In each of the abovementioned cases it is optionally provided that the temperature of the heating process according to the aforementioned step c) is between 100° C. and 350° C.

According to another aspect, the component may be kept at the temperature for a time of at least 2 seconds, preferably at least 1 minute, when the aforementioned step c) is carried out.

After carrying out the aforementioned step c) final finishing can be carried out on the component; the influence zone of this finishing is limited to the surface area of the material.

Furthermore, the material of the component can be a metallic alloy with interstitially dissolved atoms, especially a carbon-alloyed and nitrogen-alloyed steel.

The material which has been produced using the proposed process can be used to form components of a rolling bearing or sliding bearing.

Following the surface machining (see step b), in metallic materials with dissolved interstitial atoms, the heating of the component stabilizes the dislocation structure which has been produced in the edge zone when compared to corresponding pure room temperature treatments. Particularly in steels, the interstitially dissolved carbon becomes mobile in the lattice and can diffuse onto the dislocation cores with the formation of so-called Cottrell clouds (diffusion lengths typically in the range of a few dozen nanometers) and segregate there (compare Protevin-Le Chatelier effect, strain ageing). This atom arrangement is favorable in terms of energy, and thus supports the resistance of the dislocation structure which has been produced by surface machining in the plastically deformed edge zone and counteracts the incipient dislocation motion during operation. By increasing the fatigue resistance (fatigue strength) of the material the service life is thus increased. In addition, stabilization of the residual compressive stress state which has been introduced by the surface machining at room temperature in the surface layer takes place, the peak being reduced by up to roughly 10% to 20%, depending on the temperature and the duration. In doing so, optionally multistage surface machining can be carried out at room temperature, such that after its complete termination, no residual tensile stresses have been produced in the mechanically influenced edge zone. These residual stresses would adversely affect the fatigue behavior of the material.

Component processes can however lead to the build-up of local residual tensile stresses in the near-surface layer as long as they are converted into compression especially in the immediate surface area by suitable following working steps (as an example, see FIG. 1 and subsequent explanations of it).

As already mentioned, suitable temperatures for stabilization annealing which follows the surface machining, depending on the material used and the completed heat treatment, can be in the range between 50° C. and 400° C.

In doing so the respective duration is oriented to the pertinent thermally activated processes and adherence to component specifications (for example, hardness, dimensional stability). Suitable temperatures of stabilization annealing according to the aforementioned step c) can be between 100° C. to 350° C. for steel which has been martensitically through hardened, case hardened or induction hardened, as well as for bainitic or martensitic-bainitic or bainitic-martensitic components. The treatment time must be adapted to the temperature and is typically in the range between 1 minute and 1 hour when using a furnace, infrared radiation, or a salt bath, and for inductive heating between 2 seconds and 3 minutes. Decreasing temperature the time increases are possible.

The invention in intended for metallic components (for example roller bearing and slide bearing components) of materials with strain ageing after heat treatment. Surface machining and stabilization annealing as claimed in the invention follow. Afterwards finishing can also take place if the depth of its influence zone is clearly less extensive, for example, a honing process is possible here.

DETAILED DESCRIPTION OF THE INVENTION

Figure 1:
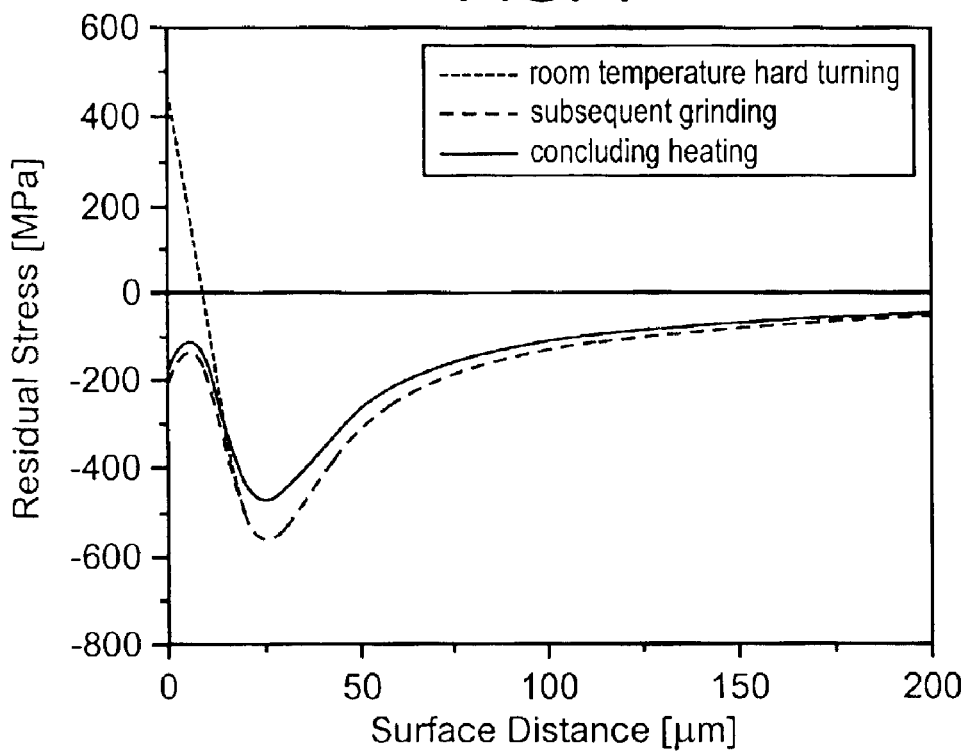
FIG. 1 is a schematic plot of residual stress vs. distance from the surface of the material for different process states.

The foregoing and additional features and characteristics of the present invention will become more apparent from the following detailed description considered with reference to the accompanying drawing figures in which like reference numerals designate like elements.

Figure 2:
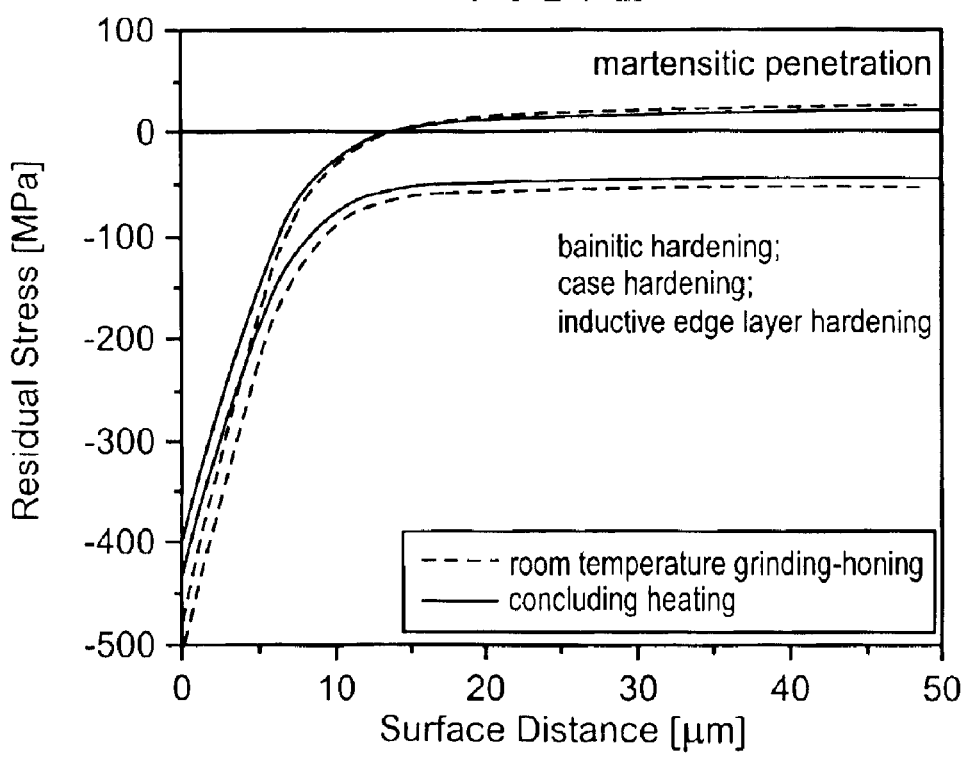
FIG. 2 is a schematic plot of residual stress vs. distance from the surface of the material for different process states.

The drawings show embodiments of the invention. FIGS. 1 and 2 show diagrams, the residual stress of a metallic component being plotted on the y-axis and the surface distance being plotted on the x-axis.

The invention can be used to produce a metallic component with a long service life. Further, a high dislocation density is produced by surface machining, such as hard turning, milling, grinding, honing and grinding, at room temperature in the plasticizing material area with a varied extent depending on the process. With suitable process control (for example, up-cut milling, hard turning with a suitable cutting edge geometry), in addition residual compressive stresses, which inhibit cracks, are formed in the edge layer, with a peak including their position under the surface depending, in turn, on the method and duration of treatment (for example grinding and honing: residual compressive stress peak around 400 to 600 MPa on the surface with steep gradients, slide grinding and high speed milling: a maximum of similar magnitude in depth less than 10 microns with a gradient which is flatter afterward).

If this residual compressive force state prevails in the surface layer and there is a suitable surface topography (for example surface roughness $R_a$ in the range around 0.1 microns for a rolling bearing raceway) the indicated processes can be used as the last working step of the pertinent component. In this case, a fatigue-resistant microstructure is stabilized by the subsequent heating of the component, according to the invention, at temperatures between 50° C. and 400° C., preferably between 100° C. and 350° C., due to the associated reduction of the dislocation mobility in the edge layer. At the same time this leads to stabilization of the generated residual compressive stress state. The process being of interest mainly for applications in which the associated slight decrease of the residual compressive stress peak of around up to roughly 10% to 20% (depending on the temperature and duration) is not relevant to the operating properties (for example, in rolling bearing components or gear wheels). Since for the described metallographic thermally activated processes are decisive, the duration of stabilization annealing according to the aforementioned step c) depends on the respective temperature. The temperature of the tempering or microstructural transformation process within the framework of heat treatment (for example, martensitic or bainitic hardening) according to the aforementioned step a) can be exceeded, but especially when using a furnace, an infrared radiation apparatus, or a salt bath, the temperature of the aforementioned step a) can also be markedly lower than of step a).

The suitable selection of the temperature and duration of the microstructure-stabilizing heating process according to the aforementioned step c) likewise depends on adhering to the component specifications. In particular, small dimensional changes and a drop in hardness which may occur should largely be avoided. Optionally, final finishing can also take place if it only leads to a much less extensive influence zone (for example, honing).

In FIG. 1, the characteristic of the residual stress is plotted vs. the surface distance for three different process states.

After conventional martensitic or bainitic through hardening of a rolling bearing ring of rolling bearing steel, hard treatment takes place at room temperature by means of hard turning almost to the final dimensions. When using a suitable cutting edge geometry, for the residual stresses which form under the track surface there is a characteristic as is shown in FIG. 1 by the dotted line.

By subsequent grinding and honing or slide grinding at room temperature, at a much lower depth of the influence zone, the residual tensile stresses near the edge are converted into the compressive range so that the overall the pure residual compressive stress characteristic shown in FIG. 1 by the broken line in the edge layer results. This improves the component service life under cyclic load.

Subsequently a heating process according to the present invention is performed.

Typically, in martensitic through hardening, case hardening or hardening into an bainitic-martensitic or martensitic-bainitic mixed structure, when using a furnace, an infrared radiation apparatus or a salt bath, a temperature between 100° C. and 300° C. is chosen (for example, depending on the duration, tempering or microstructural transformation temperature, monitoring of hardness and dimensional stability) over a treatment time interval of roughly 1 minute to 1 hour. For inductive heating, a temperature up to roughly 350° C. and times between 2 seconds and roughly 3 minutes are suitable. Complete heating of the component to the core is unnecessary since basically only the surface layer (in the example up to a depth of roughly 100 microns from the surface) is affected. In particular, the dimensional stability (especially residual austenite transformation) and hardness must be watched. Due to very low retained austenite content, problems with dimensional stability generally need not be expected in bainitic hardening, this facilitates the use of higher temperatures within the aforementioned limits.

The raceway surface, for example, can still be honed (very small zone of influence) especially if this has not taken place after grinding. Grinding and honing can take place even before the heating step of the invention.

In all cases illustrated in FIG. 1 (martensitic through hardening, bainitic hardening, case hardening, inductive edge layer hardening), if heating takes place near or above the tempering temperature (short-term or conventional tempering) or transformation temperature, the preceding heat treatment step (tempering, transformation) can be shortened accordingly. The same applies to hardening into a bainitic-martensitic or martensitic-bainitic mixed structure.

The described heating process according to the present invention leads to stabilization of the microstructure. The associated small decrease of residual stress (see in this regard in the figure the solid curve after completion of treatment) is irrelevant, especially for rolling bearing application, with regard to operating properties. Interstitially dissolved carbon atoms diffuse onto the dislocation cores, segregate there (a state which is more favorable in terms of energy, compare strain ageing) and thus stabilize the dislocation structure of the deformation microstructure in the plastic influence zone of the prior machining step. The associated dislocation anchoring prevents processes of material fatigue, especially dislocation damping and formation of sliding dislocations (high stress necessary). This increases the service life of the component. The choice of a suitable heating time and temperature depends on the carbon diffusion which represents a thermally activated process.

Another technically relevant aspect of the invention resides in that the heat treatment according to the invention follows a machining process according to the invention, which includes grinding and honing without prior hard turning. For example, martensitically or bainitically hardened material or case-hardened steel can be used. The residual stress states after grinding and honing at room temperature (broken line) and the final heating (solid line) are schematically shown by FIG. 2. This process is suitable for applications in bearings since bearing components fail from the surface in more than 90% of cases, and the dislocation structure in the area near the surface is stabilized by heating as performed according to the invention. The associated slight decrease of the residual compressive force in the surface layer is irrelevant to operation in, for example, rolling contact.

The principles, preferred embodiments and modes of operation of the present invention have been described in the foregoing specification. However, the invention which is intended to be protected is not to be construed as limited to the particular embodiments disclosed. The embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A process for producing a metallic component, the process comprising:
   a) heat treatment to harden the component, and ending the heat treatment with a heating process performed at a temperature ($T_E$);
   b) machining the component at room temperature ($T_U$) in order to bring it to its desired geometrical shape; and
   c) stabilization annealing the component by heating to a temperature (T) of 50 to 400° C. for at least one minute to effectively stabilize the microstructure that has been produced in the edge zone during surface machining which results in increasing fatigue resistance.

2. The process as claimed in claim 1, wherein step c) comprises heating the component by means of: a furnace; or infrared radiation, in each case in air, a protective gas atmosphere, or a salt bath.

3. The process as claimed in claim 1, wherein step c) comprises the component is inductively heating the component in air or in a protective gas atmosphere.

4. The process as claimed in claim 1, wherein the heat treatment according to step a) comprises martensitic penetration hardening, case hardening or induction hardening, with a final tempering process.

5. The process as claimed claim 1, wherein the heat treatment according to step a) comprises bainitic hardening of a steel.

6. The process as claimed in claim 1, wherein the heat treatment according to the step a) comprises hardening of steel into a bainitic-martensitic or martensitic-bainitic mixed structure.

7. The process as claimed in claim 4, wherein the temperature (T) according to step c) is 100° C.–350° C.

8. The process as claimed in claim 1, further comprising:
   d) final finishing the component, the finishing performed to limit the influence zone to the area of the component near the surface.

9. The process as claimed in claim 1, wherein the material of the component comprises a metallic alloy with interstitially dissolved atoms.

10. The process of claim 9, wherein the material comprises at least one of a carbon-alloyed or nitrogen-alloyed steel.

11. The process as claimed in claim 1, wherein the component comprises a steel which is suited for components of a rolling bearing or sliding bearing.

* * * * *